United States Patent [19]
Siefert

[11] 3,914,499
[45] Oct. 21, 1975

[54] FIBER REINFORCED ELASTOMERS

[75] Inventor: August C. Siefert, Granville, Ohio

[73] Assignee: Owens-Corning Fiberglas Corporation, Toledo, Ohio

[22] Filed: May 10, 1972

[21] Appl. No.: 251,881

[52] U.S. Cl. ................ 428/292; 156/167; 428/295; 428/375; 428/378; 428/391; 428/392; 428/394

[51] Int. Cl.².... B32B 3/14; D02G 3/00; D04H 3/16

[58] Field of Search .......... 161/170, 172, 175, 176, 161/140, 143; 117/126 GB, 126 GS, 72; 156/166, 167

[56] References Cited
UNITED STATES PATENTS

| | | | |
|---|---|---|---|
| 3,063,883 | 11/1962 | Brissette | 161/170 X |
| 3,091,018 | 5/1963 | Rees | 161/143 |
| 3,134,704 | 5/1964 | Modigliani | 161/150 |
| 3,276,945 | 10/1966 | Frickert | 161/175 |
| 3,509,012 | 4/1970 | Marzocchi | 161/170 |
| 3,598,693 | 8/1971 | Anderson et al. | 161/170 |
| 3,620,701 | 11/1971 | Janetos et al. | 117/126.6 B X |
| 3,653,952 | 4/1972 | Gagliardi | 117/126 GB X |
| 3,695,326 | 10/1972 | Bryant et al. | 117/126 GB X |
| 3,707,399 | 12/1972 | Uffner | 117/126.6 B X |
| 3,725,123 | 4/1973 | Marzocchi et al. | 161/170 X |
| 3,728,146 | 4/1973 | Marzocchi | 117/126 GB X |

*Primary Examiner*—Lorraine T. Kendell
*Attorney, Agent, or Firm*—Carl G. Staelin; John W. Overman; Keith V. Rockey

[57] ABSTRACT

This invention is addressed to fiber-reinforced elastomeric products wherein the reinforcement fibers are in the form of a bundle of co-formed glass and synthetic organic fibers which are intimately admixed as they are formed and subsequently treated to form a thin size coating on the surfaces thereof and/or impregnated with an elastomer compatible material to improve the bonding relationship between the bundle of co-formed fibers and elastomeric materials.

12 Claims, 6 Drawing Figures

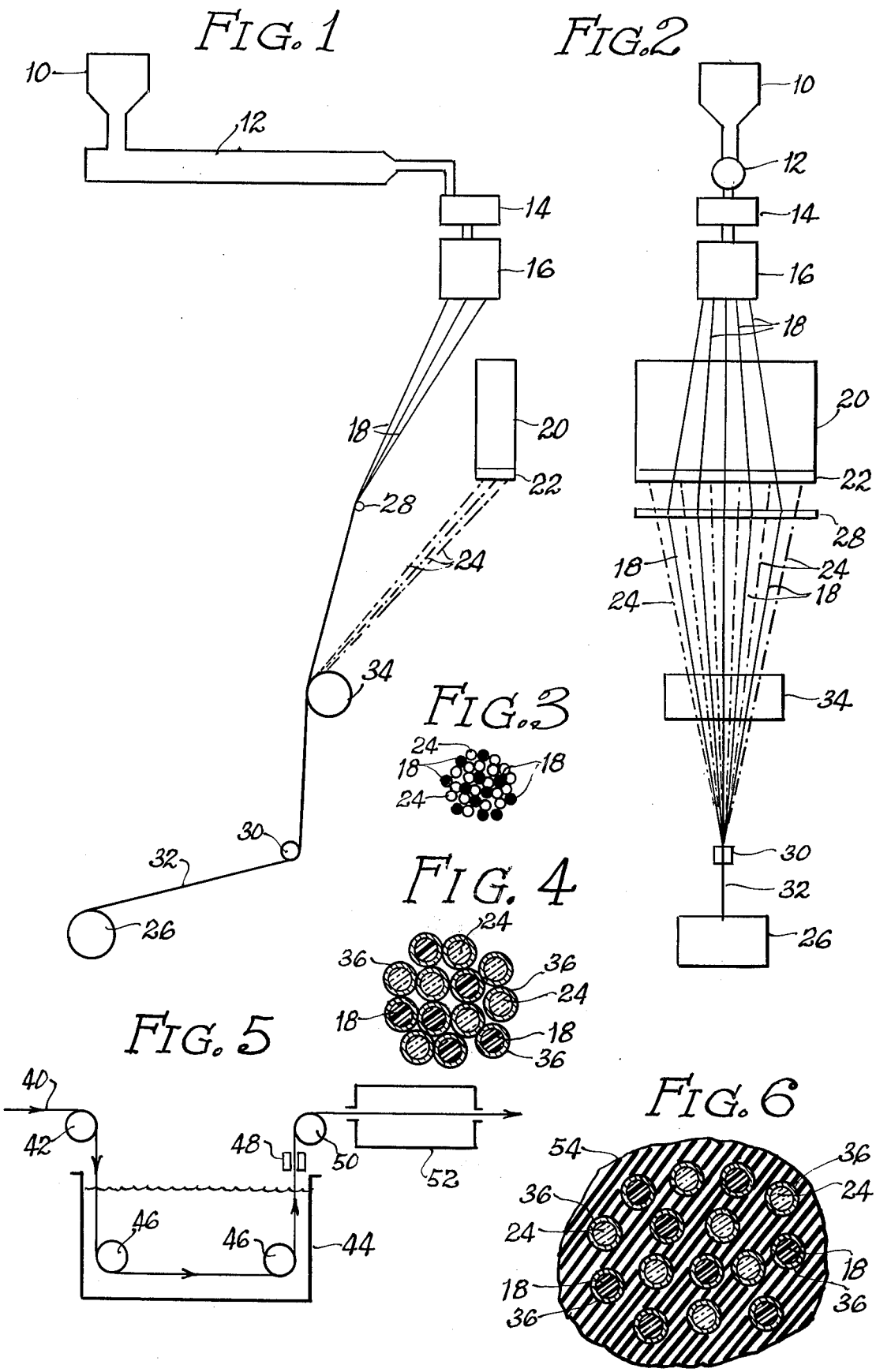

FIBER REINFORCED ELASTOMERS

This invention relates to elastomeric products reinforced with uniform blends of glass fibers and synthetic melt spun organic fibers, and more particularly to the treatment of such blends of glass fibers and organic fibers to facilitate the combination of such blends with elastomeric materials, such as in the manufacture of glass fiber-reinforced elastomeric products.

As used herein, the term "elastomer" is intended to mean and include natural rubber in the cured or uncured stage, vulcanized or unvulcanized stage, and synthetic organic elastomeric materials such as nitriles, acrylics and esters and terpolymers thereof with styrene and acrylonitriles; styrene and vinyl pyridine; and synthetic rubbers as represented by butadiene polymers and copolymers with monoolefins such as butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbom atoms, and polysulfone rubbers.

It has been found that substantially uniform blends of glass fibers and synthetic melt-spun organic fibers, such as nylon, can be manufactured by coforming and blending glass fibers with the synthetic organic fibers. Blending of the glass and synthetic organic fibers during coforming makes possible a more uniform blend as compared to attempts of the prior art to form blends of such fibers after forming because of the poor abrasion resistance of glass fibers. Thus, when attempts are made to separate glass fibers each from the other to blend synthetic fibers therewith, the glass fibers are subjected to mutual abrasion which in turn results in excessive breakage of individual glass fibers in, for example, a strand, and drastic loss of tensile strength of the strand.

The blend of glass fibers and synthetic organic polymers described combines the more desirable properties of each of the glass fiber and synthetic organic fiber components. Thus, the glass fiber component of the blend, because of its very high tensile strength, carries the load while the organic fibers, having little or no stiffness or tensile strength, provide improved abrasion resistance to the blend. In other words, the organic fibers substantially uniformly distributed within the blend serve to protect the glass fibers in the blend from destruction by mutual abrasion.

It is an object of this invention to provide a method for the treatment of blends of co-formed glass fibers and melt-spun organic fibers to facilitate the combination of such blends with elastomeric materials in the manufacture of fiber-reinforced elastomeric materials.

It is a related object of the invention to provide blends of co-formed glass fibers and melt-spun organic fibers in the form of strands, cords, yarns or fabrics, hereinafter referred to generally as bundles, which have been impregnated with an impregnant capable of providing a secure bonding relationship and improved performance characteristics of the blend of glass and organic fibers for combination with elastomeric materials in the manufacture of fiber-reinforced elastomeric products.

It is a further object of the invention to provide blends of co-formed glass fibers and organic fibers in which the fibers are coated with a composition applied in forming, or afterwards, to improve the processing and performance characteristics of the fibers to facilitate the combination of such blends with elastomeric materials in the manufacture of fiber-reinforced elastomeric products.

These and other objects and advantages of the invention will appear more fully hereinafter, and, for purposes of illustration, but not of limitation, embodiments of the invention are shown in the accompanying drawings in which:

FIG. 1 is a schematic flow diagram in side elevation, showing the manufacture of blends of co-formed glass fibers and melt-spun organic fibers in accordance with the method of the invention;

FIG. 2 is the schematic flow diagram of FIG. 1 shown in front elevation;

FIG. 3 is a sectional view of a blend of glass and synthetic organic fibers which have been combined as they are formed, in accordance with the diagrams of FIGS. 1 and 2;

FIG. 4 is a cross-sectional view of a blend of glass and synthetic fibers which have been combined as they are formed and which have been treated in accordance with the practice of the invention to improve the processing and performance characteristics of the fiber system;

FIG. 5 is a schematic flow diagram illustrating the treatment of blends of co-formed glass and synthetic organic fibers subsequent to their being formed into bundles to impregnate the bundles in accordance with the preferred practice of the invention; and FIG. 6 is a cross-sectional view of a bundle of co-formed glass and synthetic organic fibers which has been processed in accordance with the diagram of FIG. 5.

The concepts of the present invention reside in the treatment of blends of co-formed glass fibers and synthetic organic fibers to enhance the bonding relationship of such blends with elastomeric materials when the blends are used as reinforcement for elastomeric materials.

In the practice of the invention, according to one embodiment, the blends of co-formed glass and organic fibers are coated, as the glass and organic fibers are gathered together to form a strand, with a composition containing a glass fiber anchoring agent to form a thin size coating on each of the glass and organic fiber filaments which imparts a lubricity to the fibers to improve subsequent processing without destroying their fibrous characteristics.

Referring to FIGS. 1 and 2, there is shown diagrammatically apparatus for the co-forming of blends of glass and organic fibers in accordance with the invention. A melt-spinnable synthetic organic material is supplied to a hopper 10 from which it is advanced through a screw extruder 12, a metering pump 14 and a spinneret die 16, from which a plurality of synthetic organic fibers 18 issue.

Positioned below and somewhat offset from the spinneret 16 is a glass melting furnace 20 which is provided with a bushing 22 on the bottom side having openings therethrough. Molten streams of glass pass gravitationally through the openings in the bushing 22 and are rapidly attenuated into fine glass filaments 24 by means of a rapidly rotating winding drum 26 or the like.

The organic fibers 18 issuing from the spinneret 16 are passed over a dispersion head 28 which operates to maintain the organic fibers spaced substantially over the width of the glass furnace bushing 22 from which the glass fiber filaments 24 issue. Both the organic fiber filaments 18 and the glass fiber filaments 24 are gathered together at a gathering shoe 30 whereby the glass and organic fiber filaments are uniformly admixed to form a blend of the co-formed fibers in the form of a strand 32.

A cross-section of the strand 32 formed of untreated fibers is shown in FIG. 3 of the drawing. As can be seen from this figure, the organic fibers 18 are substantially uniformly dispersed among the glass fiber filaments 24. Such a uniform dispersion cannot be formed where attempts are made to blend organic fibers with glass fibers after they have been formed due to the poor abrasion resistance of the glass fibers when they are contacted each with the other.

In the practice of the present invention, as the synthetic organic fibers 18 and the glass fibers are gathered together to form the strand 32, the organic fibers 18 and the glass fibers 24 are pulled over an applicator 34 which is constantly wet with the size composition. As illustrated in FIGS. 1 and 2, the applicator can be in the form of a roller 34 which operates to coat each of the individual organic and glass fibers with a thin film of the size composition.

The sized fibers 18 and 24 are allowed to air dry, or drying of the sized fibers can be accelerated by subjecting the fibers to an elevated temperature. As shown in FIG. 4 of the drawing, the organic fibers 18 and the glass fibers 24 have a thin size coating or film 36 from the size composition, which imparts the desired lubricity to the fibers. This lubricity, along with the synthetic organic fibers dispersed throughout the strand 32, provides protection to the glass fibers 24 to prevent destruction of the glass fibers 24 by mutual abrasion as the strand 32 is subjected to subsequent processing or to load conditions as a reinforcement for elastomeric materials.

The size compositions preferred for use in the practice of the present invention are generally those conventionally used in the treatment of glass fibers alone. Such size compositions contain, as the essential component, a glass fiber anchoring agent such as an organo silicon compound or a Werner complex compound.

Preferred anchoring agents are the amino silanes, such as gamma-aminopropyltriethoxy silane, N-(beta-aminoethyl)-gamma-aminopropyltriethoxy silane, etc. However, use can also be made of any of the organo silanes as well as the corresponding silanols and polysiloxanes. Representative of other suitable anchoring agents which can be used in the practice of this invention are the organo silicons, their hydrolysis products and polymerization products (polysiloxane) or an organo silane having the formula:

$$Z_{(4-n)} Si R_n$$

wherein Z is a readily hydrolyzable group such as alkoxy having 1-4 carbon atoms (e.g., methoxy, ethoxy, propoxy, etc.) or halogen, such as chlorine, n is an integer from 1 to 3, and R is hydrogen or an organic group in which at least one R group is an alkyl group having 1-10 carbon atoms, such as methyl, ethyl, propyl, etc.; alkenyl having 1-10 carbon atoms, such as vinyl, allyl, etc.; cycloalkyl having 4-8 carbon atoms, such as cyclopentyl, cyclohexyl, etc.; aryl having 6-10 carbon atoms, such as phenyl, naphthyl, benzyl, etc.; alkoxy alkyl, such as methyloxyethyl, etc.; alkenyl-carbonyloxyalkyl, such as carbonylpropylmethoxy, etc., as well as the amino, epoxy, mercapto and halogen derivatives of the foregoing groups.

Illustrative of suitable silanes are ethyltrichlorosilane, propyltrimethoxy silane, vinyl trichlorosilane, allyl triethoxy silane, cyclohexylethyltrimethoxy silane, phenyl trichlorosilane, phenyl dimethoxy silane, methacryloxypropyltrimethoxy silane, gamma-aminopropyltriethoxy silane, beta-aminovinyldiethoxy silane, N-(gamma-triethoxysilylpropyl)propylamine, gamma-aminoallyltriethoxy silane, para-aminophenyltriethoxy silane, N-(beta-aminoethyl)-gamma-aminopropyltrimethoxy silane, gamma-chloropropyltrichlorosilane, glycidoxy propyltrimethoxy silane, 2,4-epoxycyclohexylethyltrimethoxy silane, gamma-mercaptopropyltrimethoxy silane, as well as a wide variety of others. It will be understood that the foregoing may be used in the form of the silane, the silanol or the polysiloxane formed by one or more of the foregoing materials.

Instead of organo silicon as described above, use can also be made of Werner complex compounds containing a carboxylato group coordinated with the trivalent nuclear chromic atoms, and in which the carboxylato group may also contain an amino group or an epoxy group. Suitable Werner complex compounds include stearato chromic chloride, methacrylato chromic chloride, aminopropylato chromic chloride, glycine chromic complex or glycylato chromic chloride.

The anchoring agents of the type described above are normally employed in an amount within the range of 0.1 to 5% by weight of the treating composition.

The size composition can be formulated to include, as desired, fiber-forming binders conventionally used in glass fiber size compositions. Representative of such binders include partially dextrinized starch, gelatin, vinyl polymers such as polyvinyl alcohol, polyolefins and polyacrylates and polymethacrylates as well as polyglycol condensates (e.g., polyethylene glycols) and numerous others. In addition, the size composition can be formulated to include glass fiber lubricants and/or wetting agents to further improve the processing characteristics of the blend of co-formed fibers as well as the stability of the size compositions.

Representative of size compositions which can be used in the practice of this invention is the following:

EXAMPLE 1

| Size Composition | Percent by weight |
| --- | --- |
| Gamma-aminopropyltrimethoxy silane | 1.0 |
| Fatty acid amine wetting agent (Nopcogen 16L) | 0.5 |
| Water | 98.5 |

Using the method illustrated in FIGS. 1 and 2, a polyamide (nylon) is melt spun into fibers which are blended with an equal number of glass fibers as the nylon and glass fibers are being formed. The roller applicator 34 is constantly wet with the size composition of Example 1 and operates to wet each of the glass fibers 24 and the organic nylon fibers 18 to form the thin film coating 36 on the individual surfaces thereof.

As will be appreciated by those skilled in the art, the concepts of the present invention are applicable to a wide variety of synthetic organic fibers. Preferred are the organic resinous materials which are capable of being melt-spun, such as polyamides, polyesters, vinyl polymers and copolymers (e.g. vinyl chloride-vinylidene chloride copolymers such as Saran), etc. The chemical composition of the organic material from which the fibers are derived is not critical to the practice of the invention so long as such material is fiber-forming.

The relative proportions of the organic and glass fiber filaments are similarly not critical to the practice of the invention and depend, in large measure, on the properties sought in the reinforcing fiber blend. As indicated above, the glass component of the blend contributes tensile strength while the organic fiber component contributes elongation. In general, the co-formed blends used in the practice of this invention contain from 10 to 75% organic filaments, and preferably 20 to 70% organic filaments.

Other size compositions which can be used in the practice of this invention can be illustrated by way of the following examples:

EXAMPLE 2

| Size Composition | Percent by weight |
| --- | --- |
| Partially dextrinized starch | 8.0 |
| Hydrogenated vegetable oil | 1.8 |
| Cationic wetting agent (lauryl amine acetate) | 0.4 |
| Nonionic emulsifying agent | 0.2 |
| Gamma-aminopropyltriethoxy silane | 1.0 |
| Water | 88.6 |

EXAMPLE 3

| Size Composition | Percent by weight |
| --- | --- |
| Saturated polyester resin | 3.2 |
| Fatty acid amine wetting agent (Nopcogen 16L) | 0.1 |
| Polyvinyl alcohol | 0.1 |
| Pyrrolidine | 3.0 |
| Stearato chromic chloride | 0.3 |
| Glacial acetic acid | 0.1 |
| Water | 93.2 |

EXAMPLE 4

| Size Composition | Percent by weight |
| --- | --- |
| Paraffin wax in aqueous emulsion | 0.2 |
| Cationic amide polyester resin | 1.3 |
| Polyglycol condensate (300 to 400 m.w.) | 2.3 |
| Gelatin | 0.25 |
| Gamma-aminopropyltriethoxy silane | 0.5 |
| Dibasic ammonium phosphate | 0.1 |
| Glacial acetic acid | 0.2 |
| Water | 95.15 |

The size compositions of Examples 2 to 4 can be applied to the co-formed blends of organic and glass fibers in accordance with the method described in Example 1. In general, application of such size compositions is made in an amount sufficient to form a thin film coating constituting from 1 to 12% by weight of the sized fibers.

The strand 32 of sized fibers is preferably plied with other strands and twisted to form yarns, threads or cords which may be used as reinforcement for elastomeric materials, with or without cutting to shorter lengths, and which can be formed into woven or nonwoven fabrics for subsequent combination with elastomeric materials. The glass fiber anchoring agent not only serves to impart improved lubricity to the individual fibers to prevent destruction of the glass fibers from mutual abrasion, but also serves to securely anchor both the glass and organic fibers to the elastomeric materials.

In accordance with the preferred practice of this invention, after the fibers have been processed into yarns, cords or fabrics, generally referred to in the art as bundles, as described above, the bundles of co-formed organic and glass fibers which have a thin size coating on the individual surfaces thereof are impregnated with a composition of an elastomer compatible material to further enhance the bonding relationship between the treated fibers and elastomeric materials in the manufacture of fiber reinforced elastomeric products, such as drive belts, pneumatic tires and the like.

It has been found that best results are frequently obtained when the elastomer compatible material employed in the impregnation of the bundles of co-formed organic and glass fibers is formed of at least an elastomer component, and preferably a blend of a resorcinol-aldehyde resin component and an elastomer component, and is of the type used in the treatment of bundles of glass fibers. One impregnating composition which has been found to provide good results is the impregnating composition described in U.S. Pat. No. 3,567,671. Such a composition is illustrated by the following example:

EXAMPLE 5

| Impregnating Composition | Parts by weight |
| --- | --- |
| Resorcinol-formaldehyde resin | 5 |
| Vinyl pyridine-butadiene-styrene terpolymer (Gentac from General Tire and Rubber Co.) | 50 |
| Vinyl chloride-vinylidene chloride copolymer (Dow latex 874) | 20 |
| Microcrystalline wax | 10 |

The balance of the composition is water the amount of which is adjusted to provide a total solids content of 25 to 50% by weight.

Impregnation of the bundle of sized co-formed organic and glass fibers can be effected by any conventional method. Referring to FIG. 5 of the drawing, a bundle 40 of the blend of organic and glass fibers sized in Example 1 is advanced over a guide roller 42 for passage downwardly into a bath 44 containing the aqueous impregnating composition of Example 5. The bundle 40 is turned under rollers 46 to effect a sharp bend which operates to open the bundle to enable more complete penetration of the impregnating composition into the bundle of individually sized organic and glass fibers. Penetration of the impregnating composition into the bundle 40 is further facilitated by the fact that the organic fibers tend to open the bundle when under tension or in a relaxed state.

The impregnated bundle is then raised from the bath 44 for passage through a roller or die 48 which operates to remove excess impregnating composition and to work the impregnating composition into the bundle. Thereafter, the endless bundle is advanced over roller 50 into a drying oven 52, such as a dielectric, microwave, hot gas or radiant oven, to accelerate removal of the aqueous diluent and to set the impregnant in situ in the fiber bundle.

The resulting bundle is shown in FIG. 6 of the drawing. As can be seen in this figure, the impregnant 54 completely fills the interstices between the organic fibers 18 having the size coating 36 thereon and the glass fibers 24 having the size coating 36 thereon, and separates the fibers each from the other to cushion the fibers and further serve to protect the fibers from destruction through mutual abrasion during subsequent processing and/or during use as a reinforcement in fiber-reinforced elastomeric products.

As indicated by the above patent, an acrylic resin and/or a monocarboxylated butadiene-styrene resin can be used in place of all or a part of the vinyl chloride-vinylidene chloride component of the composition of Example 5. Such compositions can be represented by the following example:

EXAMPLE 6

| Impregnating Composition | Parts by weight |
| --- | --- |
| Resorcinol-aldehyde resin | 2-10 |
| Vinyl pyridine-butadiene-styrene terpolymer | 20-60 |
| Vinyl chloride-vinylidene chloride copolymer; monocarboxylated butadiene-styrene resin or acrylic resin | 15-40 |
| Microcrystalline wax | 3-30 |

The balance of this impregnating composition is water in an amount to adjust the solids content to within the range of 25 to 50% by weight.

The impregnating compositions used in the practice of the invention are applied in an amount sufficient to deposit dry solids constituting from 5 to 35% by weight of the fiber system.

Another impregnating composition which has been found to provide good results is the system described in the above patent in which use is made of a dicarboxylated butadiene-styrene resin in lieu of the monocarboxylated resin of Example 5.

Such a composition may be illustrated by the following example:

EXAMPLE 7

| Impregnating Composition | Parts by weight |
| --- | --- |
| Resorcinol-aldehyde resin | 2-10 |
| Vinyl pyridine-butadiene-styrene terpolymer | 20-60 |
| Dicarboxylated butadiene-styrene resin (Pliolite 4121 - Goodyear) | 15-40 |
| Microcrystalline wax | 3-30 |

Water is added to the foregoing composition to adjust the solids content to within the range of 25 to 50% by weight. The composition has been found to be particularly effective in the treatment of bundles of co-formed glass and nylon or polyester fibers which have been sized with the composition of Example 4 in accordance with the procedures of Examples 1 and 5.

Use can also be made of a variety of other impregnating compositions in the treatment by impregnation of bundles of co-formed glass and organic fibers in which the individual fibers have been sized with a composition of the type illustrated in Examples 1 to 4. One such impregnation composition is disclosed in U.S. Pat. No. 3,424,608 and is shown in the following general example:

EXAMPLE 8

| Impregnating Composition | Parts by weight |
| --- | --- |
| Resorcinol-formaldehyde resin | 2-10 |
| Formaldehyde (37% solution) | 1-3 |
| Concentrated ammonium hydroxide | 2-5 |
| Vinyl pyridine terpolymer (42% solids) | 15-50 |
| Neoprene rubber latex (50% solids) | 25-50 |
| Butadiene latex (60% solids) | 5-15 |
| Alkali metal hydroxide | .05-0.2 |
| Water for solids content of 10 to 50% | |

Use can also be made of combinations of a resorcinol-aldehyde resin and an elastomer latex such as a vinyl pyridine-butadiene-styrene terpolymer or rubber latex. Such a composition may be formulated as follows:

EXAMPLE 9

| Impregnating Composition | Parts by weight |
| --- | --- |
| Resorcinol-formaldehyde resin - natural rubber latex (38% solids, "Lotol") | 30 |
| Water | 70 |

A suitable resorcinol-aldehyde resin and combination thereof with a vinyl pyridine-butadiene-styrene terpolymer latex is marketed by the U.S. Rubber Company under the trade name "Lotol". For the preparation of such materials, reference can be made to Canadian Pat. No. 435,754 wherein description is made of the reaction of resorcinol and formaldehyde in the presence of a substantial amount of short-chained alkylamines for the purpose of stabilizing the reaction and the products formed therefrom, as well as a description of the combination of the formed resin with elastomer latices.

In the preferred practice of the present invention, the bundles of the present invention are formed of two or more strands of the blends of the invention in which the strands have been plied and twisted together. The twisting of the strands is particularly advantageous since the twisting serves to further increase the elongation of the resulting bundle. One of the unique features of fiber blends of the present invention is that a low twist is capable of providing higher elongation. Generally, the strands are twisted from 0.5 to 7.0 twists per inch.

The twisting and plying of the strands of blended glass and organic fibers to form cords can be carried out either before or after impregnation. It is sometimes preferred to ply and twist the strands together after impregnation of the strands to facilitate more complete penetration of the solids of the impregnating composition into the bundle. It is desirable to achieve as complete impregnation as possible to completely separate each fiber from the others to insure that the impregnant serves to cushion the fibers forming the bundle and protect the individual fibers, and particularly the individual fibers at or near the center of the bundle, from destruction through mutual abrasion. Mutual abrasion represents a particularly severe problem as to the innermost fibers when the fibers are combined with elastomeric materials in the manufacture of fiber-reinforced elastomeric products which are subjected to sharp and frequent flexing, such as fiber reinforced tires and the like. The impregnant in the bundle of blended fibers in accordance with the present invention operates to coat each of the fibers forming the bundle while separating the fibers each from the other to assist the organic fiber component of the bundles in the protection of the glass fiber component.

More complete protection for the individual fibers and more complete coordination with the elastomeric material constituting the continuous phase can be achieved in accordance with another embodiment of the invention in which the compositions of Examples 5 to 9 are modified to include one or more of the anchoring agents described above for application to the fibers as they are formed as a size to individually coat each of the fibers of the blend.

Sizes embodying these concepts of the invention can be formulated in accordance with the following examples:

EXAMPLE 10

| Size Composition | Parts by weight |
|---|---|
| Resorcinol-aldehyde resin | 2–10 |
| Vinyl pyridine-butadiene-styrene terpolymer | 20–60 |
| Vinyl chloride-vinylidene chloride copolymer | 15–40 |
| Microcrystalline wax | 3–30 |
| Anchoring agent (Gamma-aminopropyltriethoxy silane) | 0.1–5 |

EXAMPLE 11

| Size Composition | Parts by weight |
|---|---|
| Resorcinol-aldehyde resin | 2–10 |
| Vinyl pyridine-butadiene-styrene terpolymer | 20–60 |
| Dicarboxylated butadiene-styrene resin | 15–40 |
| Microcrystalline wax | 3–30 |
| Anchoring agent | 0.1–5 |

EXAMPLE 12

| Size Composition | Parts by weight |
|---|---|
| Resorcinol-aldehyde resin | 2–10 |
| Vinyl pyridine-butadiene-styrene terpolymer | 20–60 |
| Anchoring agent | 0.1–5 |

Each of the compositions of Examples 10 to 12 is diluted with water to adjust the solids content to within the range of 5 to 40% by weight. Application of the compositions to blends of co-formed glass and organic fibers can be made in accordance with the procedure desdribed in Example 1 to coat the individual fibers forming the blend with 5 to 20% by weight dry solids.

Bundles of co-formed glass and organic fibers in which the individual fibers have been coated with one of the compositions of Examples 10 to 12 can be processed directly into sized yarns, cords or fabrics, or used alone in combination with elastomeric materials without the need for impregnation.

It will be understood by those skilled in the art that compositions of Example 10 to 12 can be used as impregnating compositions, preferably with less dilution, to impregnate bundles of fibers in accordance with the procedure of Example 5 whereby the anchoring agent continues to intertie the fibers to the elastomeric material.

In facilitating the combination of bundles of fibers treated in accordance with the present invention with elastomeric materials, the bundles of fibers containing a coating on the surfaces thereof, or bundles of fibers containing an impregnant therein, are mixed with elastomeric material or otherwise laid down in the desired arrangement for combination with the elastomeric material, as in the manufacture of fiber-reinforced belts or in the manufacture of rubber tires reinforced with cords or fibers. The combination of fibers and elastomeric material is processed in a conventional manner by mold or cure under heat and compression or vulcanized for advancement of the elastomeric material to a cured or vulcanized stage while in combination with the treated bundles of fibers whereby the bundles of glass fibers become strongly integrated with the elastomeric materials in the glass fiber-elastomeric product.

In the final system, the elastomeric material with which the bundles of glass fibers are combined, constitutes a continuous phase. Such continuous phase elastomeric materials may comprise elastomers or rubbers of the type incorporated into the treating composition or the elastomeric material can differ therefrom. It is believed that the tie-in between the bundles of individually coated fibers or the impregnated bundles of glass fibers and the elastomeric materials forming the continuous phase occurs primarily during cure or vulcanization of the elastomeric material in combination with the treated fibers.

It will be apparent that various changes and modifications can be made in the details of procedure, formulation and use without departing from the spirit of the invention, especially as defined in the following claims.

I claim:

1. In a fiber-reinforced elastomeric product wherein an elastomeric material constitutes a continuous phase in which the fibers are distributed, the improvement wherein the fiber reinforcement comprises a bundle of a substantially uniform blend of elongate continuous glass fibers and organic fibers formed from a fiber-forming organic material in which the fibers have been blended as they are formed, each of the glass and organic fibers having a thin film coating on the surfaces thereof formed from an anchoring agent selected from the group consisting of an organo silicon compound and a Werner complex compound.

2. A fiber reinforced product as defined in claim 1 wherein the fibers are in the form of a strand.

3. A fiber reinforced product as defined in claim 1 wherein the fibers are in the form of two or more strands which have been plied together.

4. A fiber reinforced product as defined in claim 3 wherein the strands have been plied and twisted together.

5. A fiber reinforced product as defined in claim 1 wherein the thin film also includes a film-forming resinous binder.

6. A fiber reinforced product as defined in claim 1 wherein the thin film also includes an elastomer component.

7. In a fiber-reinforced elastomeric product wherein an elastomeric material constitutes a continuous phase in which the fibers are distributed, the improvement wherein the fiber reinforcement comprises a bundle formed of a substantially uniform blend of elongate continuous glass fibers and organic fibers formed from an organic fiber-forming material in which the fibers have been blended as they are formed, with the individual glass and organic fibers forming the bundle each having a thin film coating on the surfaces thereof, said film coating containing an anchoring agent selected from the group consisting of an organo silicon compound and a Werner complex, and an impregnant in the bundle, said impregnant comprising an elastomer and substantially filling the interstices between the fibers.

8. A fiber-reinforced product as defined in claim 7 wherein the fibers are in the form of a strand.

9. A fiber-reinforced product as defined in claim 7 wherein the fibers are in the form of two or more strands which have been plied together.

10. A fiber-reinforced product as defined in claim 9 wherein the strands have been plied and twisted together.

11. A fiber-reinforced product as defined in claim 7 wherein the impregnant comprises a blend of a resorcinol-aldehyde resin and an elastomer.

12. A fiber-reinforced product as defined in claim 7 wherein the organic fibers are uniformly distributed over the cross-section of the bundle.

* * * * *